United States Patent Office 3,074,933
Patented Jan. 22, 1963

3,074,933
21-AMINO-3β,20-DIHYDROXY-ALLOPREGNANES
Fred A. Kincl, Mexico City, Mexico, assignor, by mesne assignments, to Syntex Corporation, a corporation of Panama
No Drawing. Filed Feb. 14, 1962, Ser. No. 173,133
8 Claims. (Cl. 260—239.5)

The present invention relates to certain new cyclopentanophenanthrene derivatives and to the method for making the same.

More particularly, the present invention refers to the novel 21-amino-3β,20-dihydroxy-allopregnanes, and to the esters thereof, which are represented by the following formula:

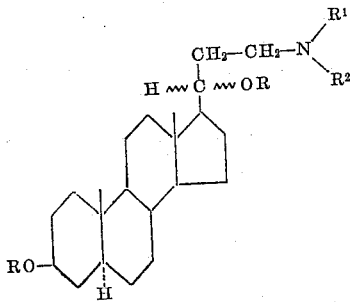

In the above formula, R represents hydrogen or the acyl residue of a hydrocarbon carboxylic acid containing less than 12 carbon atoms. $R^1$ and $R^2$ each represent hydrogen, alkyl, aryl, aralkyl or dialkylaminoalkyl groups having from 1 to 8 carbon atoms; $R^1$ and $R^2$ together with the nitrogen atom may also represent a heterocyclic radical such as piperidyl, morpholyl, pyrrolidyl or piperazyl, which may or may not be substituted with a lower alkyl radical. The wavy line at C-20 indicates the α or β configuration for the hydroxy (acyloxy) group in such position.

The present invention also comprises the inorganic and organic salts formed by treatment of the amino compounds with acids, such as for example hydrochloric, hydrobromic, sulfuric, phosphoric, tartaric or ethylsulfonic acid.

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds object of the present invention are bacteriostatic agents active against gram positive bacteria, such as *Staphylococcus aureus* and *Mycobacterium tuberculosis*. They are also useful as stimulants of the central nervous system.

The salts are water soluble and may therefore be used with advantage in aqueous solution.

The compounds object of the present invention are obtained by treating allopregnanolone with formaldehyde and an amine under appropriate conditions, followed by reduction at C-20 with a double metal hydride and esterification of the hydroxyl groups.

The process outlined above is illustrated by the following sequence of reactions:

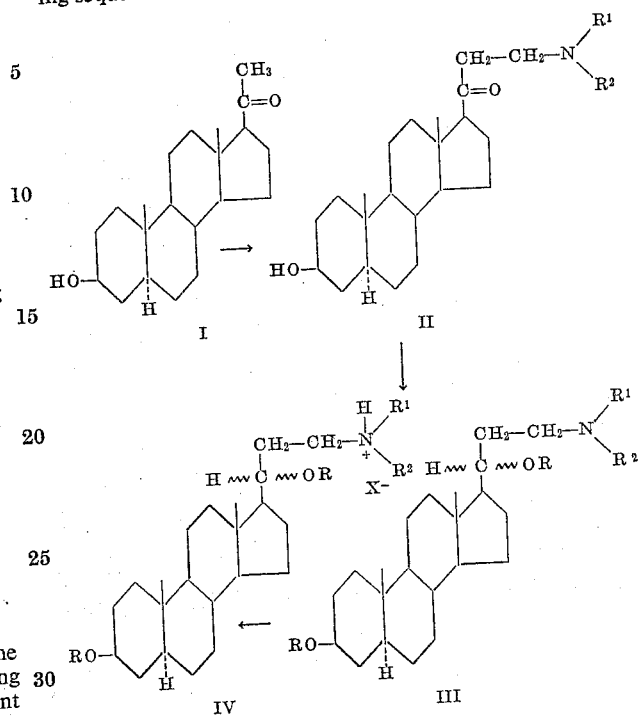

In the above formulas R, $R^1$ and $R^2$ have the same meaning as heretofore set forth; X represents an anion residue of the previously mentioned acids.

In practicing the process outlined above, allopregnan-3β-ol-20-one (I) is subjected to a Mannich type condensation by treatment with paraformaldehyde and an amine hydrochloride, in an inert organic solvent, preferably using isoamyl or teramyl alcohols as solvent. The reaction is effected at reflux temperature and for a period of time in the order of 1 to 6 hours.

There can be used for this reaction the hydrochlorides of a great variety of amines: aliphatic primary or secondary amines such as dimethylamine, diethylamine, methyl ethylamine or the like; aromatic amines such as benzylamine, methyl aniline, phenethylamine or heterocyclic amines, such as for example piperidine, piperazine, morpholine, pyrrolidine etc., to give the corresponding 21-aminoallopregnanes (II).

Upon treatment of these 21-amino compounds with a double metal hydride, such as lithium aluminum hydride or sodium borohydride, the 20-keto group is reduced to give a mixture of the 20α- and 20β-alcohols, predominating the β-isomer (III:R=H) which can be separated by the ordinary methods, preferably by chromatography or crystallization.

The 21-amino-3β,20β-dihydroxy allopregnanes thus obtained are esterified by conventional methods with acid anhydrides or chlorides in pyridine solution to give the corresponding diesters (III:R=acyl).

If so desired, the amines may be converted into the inorganic or organic salts (IV), for example, by treatment with hydrochloric, sulfuric, phosphoric, tartaric acid etc. in ether solution.

The following examples serve to illustrate but are not intended to limit the scope of the present invention:

Example I

A mixture of 10.5 g. of allopregnan-3β-ol-20-one, 3 g. of formaldehyde, 7.5 g. of dimethyl amine hydrochloride and 85 cc. of isoamyl alcohol was refluxed for 1 hour. The cooled reaction mixture was poured into 200 cc. of dilute hydrochloric acid (1:9), the resulting solution was washed three times with 200 cc. of ether. The aqueous layer was then alkalized with sodium bicarbonate solution and extracted with ether. The organic extract was dried over anhydrous sodium sulfate and evaporated to dryness. Crystallization from ether gave 21-(N,N-dimethylamino methyl) allopregnan-3β-ol-20-one.

A solution of 1 g. of sodium borohydride in 3 cc. of water was added to an ice-cooled solution of 1 g. of the above compound in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue, consisting of a mixture of 20α and 20β-hydroxy compounds, was purified by crystallization from acetone-hexane to give the 21-(N,N-dimethylamino methyl) allopregnane-3β,20β-diol, with M.P. 96–102° C.

Example II

Into a solution of 1 g. of 21-methyl (N,N-dimethyl-amino) allopregnan-3β,20β-diol in 50 cc. of anhydrous ether, there was passed a slow stream of anhydrous hydrogen chloride, for 1 hour. The white precipitate formed was collected by filtration, washed with anhydrous ether and dried under vacuum, to give 960 mg. of the chlorohydrate of 21-(N,N-dimethylamino methyl)allopregnane-3β,20β-diol; M.P. 309–310° C.

Example III

A mixture of 1.6 g. of 21-(N,N-dimethylamino methyl) allopregnane-3β,20β-diol, 10 cc. of pyridine and 5 cc. of propionic anhydride was heated on the steambath for 3 hours. It was then poured into water, extracted with ethyl acetate, and the organic extract washed with water several times, dried over anhydrous sodium sulfate and evaporated to dryness under vacuum. The residue was crystallized from methanol, to give the dipropionate of 21-(N,N-dimethylamino methyl)allopregnane-3β,20β-diol.

500 mg. of the above compound were converted into the corresponding chlorohydrate, by following the method described in Example II; M.P. 263–265° C. $[\alpha]_D +38°$ (MeOH).

Example IV

A mixture of 7 g. of allopregnan 3β-ol-20-one, 1.2 g. of paraformaldehyde, 3 g. of piperidine hydrochloride and 100 cc. of t-amyl alcohol, was refluxed for 4 hours. The resulting solution was worked up by the method described in Example I, thus producing 21-piperidinomethyl-allopregnan-3β,ol-20-one.

A solution of 1 g. of the preceding piperidinomethyl compound in 50 cc. of tetrahydrofuran was added over a 30 minute period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate; the combined organic solutions upon evaporation, yielded a crude material, which was purified by crystallization from acetone-hexane, thus giving 21-piperidino-methyl-allopregnane-3β,20β-diol.

Example V

In the method of Example I, there was substituted the dimethylamine hydrochloride for methylaniline hydrochloride; there was thus produced 21-(N-methylanilino-methyl)allopregnan-3β-ol-20-one, which after reduction with sodium borohydride in methanol solution, gave 21-methyl-anilino-methyl-allopregnane-3β,20β-diol in mixture with the 20α-isomer.

Example VI

To a solution of 500 mg. of 21-methyl anilinomethyl-allopregnane-3β,20β-diol in 35 cc. of anhydrous ether, there was added a mixture of anhydrous ether containing concentrated sulfuric acid. The mixture was kept for 10 minutes at room temperature, the formed precipitate collected by filtration, washed with anhydrous ether and dried in a desiccator over sulfuric acid. There was thus obtained the pure sulfate of 21-methylanilino methyl-allopregnane-3β,20β-diol.

In another experiment, the sulfuric acid was substituted by phosphoric acid, to give the corresponding phosphate.

Example VII

A solution of 2 g. of 21-piperidinomethyl-allopregnane-3β,20β-diol in 50 cc. of anhydrous methanol was treated with 1 g. of tartaric acid, and the mixture kept at room temperature for 24 hours. The white precipitate formed was separated by filtration and recrystallized from ethanol, thus affording the tartrate of 21-piperidinomethyl-allopregnane-3β,20β-diol.

In a similar manner, 21-methyl(N,N dimethylamino) allopregnane-3β,20β-diol was converted into the corresponding tartrate.

Example VIII

Example IV was repeated, but using pyrrolidine hydrochloride instead of piperidine hydrochloride, thus producing 21-pyrrolidinomethyl-allopregnan-3β-ol-20-one and 21-pyrrolidinomethyl-allopregnane-3β,20β-diol.

A mixture of 500 mg. of the latter compound, 2 cc. of cyclopentylpropionic anhydride and 2 cc. of pyridine was kept at room temperature overnight. It was poured into water, extracted with methylene chloride and the organic extract washed with water, dried over anhydrous sodium sulfate and evaporated to dryness. Crystallization from acetone hexane gave 21-pyrrolidinomethyl-allopregnane-3β,20β-diol-dicyclopentylpropionate.

Upon treatment of the above compound with hydrogen chloride in anhydrous ether, there was obtained the corresponding chlorohydrate.

Example IX

A mixture of 3.6 g. of allopregnan-3β-ol-20 one, 0.6 g. of paraformaldehyde, 25 cc. of t-amyl alcohol and 1.3 g. of morpholine hydrochloride was refluxed during 4 hours. After the usual isolation technique, there was obtained 21 - morpholinomethyl - allopregnan-3β-ol-20-one. Upon reduction of the above compound with sodium borohydride in methanol, there was produced 21-morpholino-methyl-allopregnane-3β,20β-diol.

Example X

A mixture of 1 g. 21-methyl (N,N-dimethyl amino) allopregnane-3β,20β-diol, 5 cc. of pyridine and 5 cc. of acetic anhydride was kept at room temperature overnight. It was then poured into water and the formed precipitate collected by filtration, thus giving the diacetate of 21-methyl (N,N-dimethylamino) allopregnane-3β,20β-diol. By the same method, 21-piperidinomethyl-allopregnane-3β,20β-diol, 21-pyrrolidino methyl-allopregnane-3β,20β-diol and 21-morpholinomethyl-allopregnane-3β,20-diol were converted into the corresponding diacetates.

In a similar manner, but using caproic, valeric and undecenoic anhydrides as esterifying agents, there were produced the dicaproate, divalerate and diundecenoates of such compounds.

Example XI

Example IX was repeated, but using piperazine hydrochloride, instead of morpholine hydrochloride. There were thus obtained 21-piperazinomethyl-allopregnan-3β-ol-20-one and 21-piperazinomethyl-allopregnane-3β,20β-diol.

Esterification of the latter compound with propionic anhydride, by following the method of Example III, gave the dipropionate of 21-piperazinomethyl-allopregnane-3β,20β-diol.

The above compound was then converted into the corresponding sulfate by treatment with sulfuric acid in ether, in accordance with the method described in Example VI.

I claim:
1. A compound selected from the group consisting of those of the following formula:

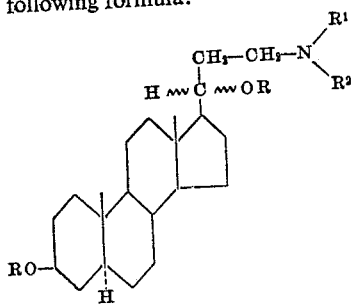

and the water soluble acid salts thereof; wherein R is selected from the group consisting of hydrogen and a hydrocarbon acyl radical of less than 12 carbon atoms; $R^1$ and $R^2$ are selected from the group consisting of hydrogen, alkyl, aryl, aralkyl, and dialkylaminoalkyl radicals containing 1 to 8 carbon atoms and $R^1$ and $R^2$ together with the nitrogen atom form a heterocyclic radical selected from the group consisting of piperidino, morpholino, pyrrolidino and piperazino.

2. 21-(N,N-dimethylaminomethyl)-allopregnane-3β,20β-diol.
3. 21-piperidinomethyl-allopregnane-3β,20β-diol.
4. 21-morpholinomethyl-allopregnane-3β,20β-diol.
5. 21-pyrrolidinomethyl-allopregnane-3β,20β-diol.
6. 21-piperazinomethyl-allopregnane-3β,20β-diol.
7. The dipropionate of 21-(N,N-dimethylaminomethyl)-allopregnane-3β,20β-diol.
8. The chlorohydrate of 21-(N,N-dimethylaminomethyl)-allopregnane-3β,20β-diol.

No references cited.